(12) United States Patent
Levy et al.

(10) Patent No.: US 8,360,573 B2
(45) Date of Patent: Jan. 29, 2013

(54) SUNGLASS FRAME

(75) Inventors: Gordon Levy, Golden, CO (US); Hoi Kwan Wong, Thornton, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 111 days.

(21) Appl. No.: 12/926,273

(22) Filed: Nov. 5, 2010

(65) Prior Publication Data

US 2012/0113382 A1    May 10, 2012

(51) Int. Cl.
*G02C 3/00* (2006.01)
(52) U.S. Cl. ............................................ 351/52; 351/51
(58) Field of Classification Search .................... 351/51, 351/52, 153, 158, 41; 16/228
See application file for complete search history.

(56) References Cited

U.S. PATENT DOCUMENTS

| 4,968,129 | A | * | 11/1990 | Grendol | 351/153 |
| 5,699,140 | A | * | 12/1997 | Fuhrman | 351/155 |
| D470,883 | S | | 2/2003 | Teng | D16/326 |
| D484,173 | S | | 12/2003 | Jannard et al. | D16/319 |
| D547,794 | S | | 7/2007 | Jannard et al. | D16/326 |
| D553,176 | S | | 10/2007 | Yee et al. | D16/326 |
| D554,689 | S | | 11/2007 | Jannard et al. | D16/326 |
| D555,187 | S | | 11/2007 | Yee | D16/326 |
| D567,844 | S | | 4/2008 | Miklitarian | D16/326 |
| D571,392 | S | | 6/2008 | Miklitarian | D16/326 |
| D610,603 | S | | 2/2010 | Thixton | D16/326 |

* cited by examiner

*Primary Examiner* — Hung Dang
(74) *Attorney, Agent, or Firm* — Jacobson Hollman PLLC

(57) ABSTRACT

A pair of sunglasses having interengaging surfaces of a temple portion and a lens frame portion with a groove, passageway or recess provided in or defined by at least one of the temple portion and the lens frame portion to accommodate a sliding therein of a hang tag attachment string or cord.

5 Claims, 5 Drawing Sheets

SUNGLASS FRAME

FIELD OF THE INVENTION

The present invention relates to the field of sunglass or eyeglass frames which are on display for sale at a retailer and have an identifying hang tag connected by a string to the intersection between a lens frame portion and a temple portion of the frame.

BACKGROUND OF THE INVENTION

Sunglasses are often displayed for retail sale on a vertical rotatable rack. Many vertical rows of sunglasses are displayed to the individual with a frame portion including the lenses facing the consumer. An identifying tag connected to the nose bridge or the intersection of a side temple and the lens frame portion includes indicia identifying the sunglasses by manufacturer, price, bar code, address of manufacturer, stock number and/or other identifying indicia.

When an individual is desirous of purchasing a pair of sunglasses, the sunglasses are removed from the display rack and placed on the face of the potential purchaser. A mirror on the display rack is used to display the image of a potential purchaser wearing the sunglass product.

In the instance where a hang tag is connected to the sunglasses in the area between the temple portion and the lens frame portion, it is difficult to fully extend the temple portion to its normally intended position of extension such that the sunglasses may be properly fitted on the face of the potential purchaser. This is because the string, connecting wire or other attachment piece is normally cinched into a space between the temple portion and lens frame portion such that the tag is not removable from the body of the sunglasses.

A reduced width portion of the temple portion which fits into a recess in the lens frame portion of the sunglasses is normally used to hang the sales tag or indicia tag of the sunglasses. In this position, it is very difficult, if not impossible, to fully extend the temple portion into its position of normal use due to the trapping of the string or other portion connecting the hang tag to the sunglasses in the gap between the temple portion and lens frame portion. The presence of the string between the temple portion and frame portion forces the temple portion inwardly towards the opposite temple portion so that the potential consumer never can achieve a proper positioning of the temple portion into its intended position.

This possibly prevents the consumer from properly fitting the sunglasses due to the forced inward angle location of the temple portion. Even if the consumer is able to force the sunglasses onto their face, the angled inwardly positioned temple portion will be uncomfortable, potentially dissuading the consumer from ultimately purchasing the sunglasses.

This problem in marketing of sunglasses has been a hindrance to sales in the sunglass industry.

SUMMARY OF THE INVENTION

Accordingly, it is an object of the present invention to have a hang tag with a connecting string positioned in the normal location between a temple portion and a lens frame portion of a pair of sunglasses without the connecting string interfering with the complete extension of the temple portion with respect to the lens frame portion. A consumer may thereby try on the pair of sunglasses without being hindered by an improper positioning of the temple portion.

This object of the present invention is achieved by providing a groove, passageway or recess in at least one of an extension portion of the temple portion and the lens frame portion so as to receive the connecting string of a hang tag in a recessed orientation which does not interfere with the complete extension of the temple portion. The end edge of the temple portion is thereby able to fully engage with a mating surface (end edge) of the lens frame portion.

This recess or groove is unobtrusive and does not interfere with the use of the sunglasses, even after the sunglasses are purchased and the hang tag and connecting string are removed. The security of the engagement of the hang tag on the sunglass frame is unhindered with complete extension of the temple portion with respect to the lens frame portion being achieved.

Accordingly, it is another object of the present invention to provide a pair of sunglasses having interengaging surfaces of a temple portion and a lens frame portion with a groove, passageway or recess provided in at least one of the temple portion and the lens frame portion to accommodate a sliding therein of a hang tag attachment string or cord.

It is still another object of the present invention to provide a pair of sunglasses having interengaging surfaces of a temple portion and a lens frame portion with a groove, passageway or recess provided in at least one of the temple portion and the lens frame portion to accommodate a sliding therein of a hang tag attachment string or cord with the hang tag being secured to the sunglasses without interfering with the complete extension of the temple portion with respect to the lens frame portion.

It is still yet another object of the present invention to provide a pair of sunglasses having interengaging surfaces of a temple portion and a lens frame portion with a groove, passageway or recess provided in at least one of the temple portion and the lens frame portion to accommodate a sliding therein of a hang tag attachment string or cord with the hang tag being secured to the sunglasses without interfering with the complete extension of the temple portion with respect to the lens frame portion and the hang tag being secured to the sunglasses in both a collapsed and extended position of the temple portions with respect to the lens frame portion.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
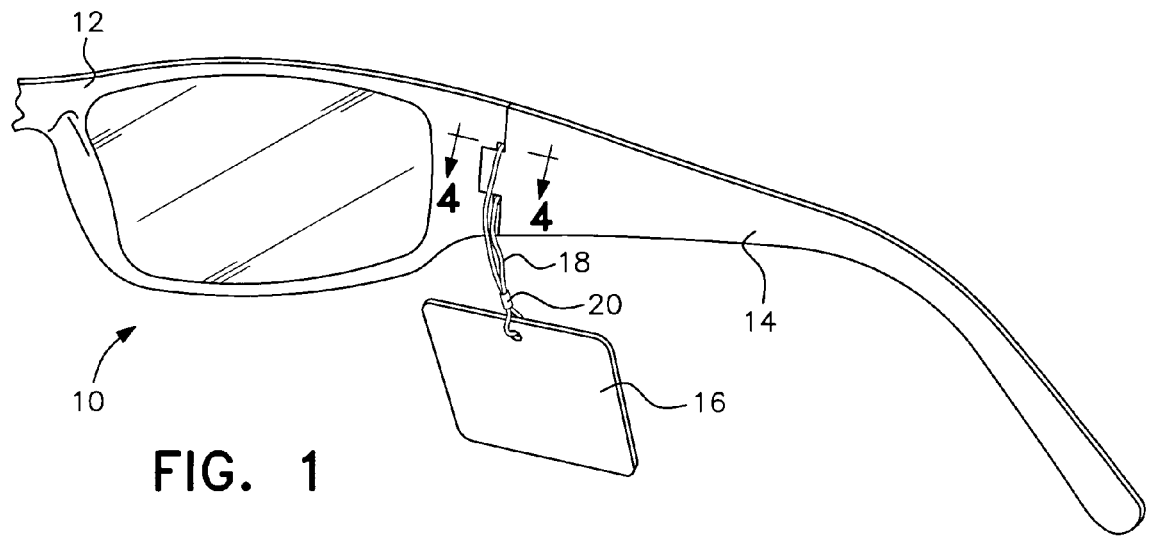
FIG. 1 illustrates the interconnection of a hang tag between a temple portion and a lens frame portion of the sunglasses of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

With reference to the drawings, in general, and to FIGS. 1 through 4, in particular, a pair of sunglasses embodying the teachings of the subject invention is generally designated as 10. With reference to its orientation in FIG. 1, the sunglasses 10 include a lens frame portion 12 and a temple portion 14. It is understood as being within the scope of the present invention that the invention is equally applicable to a pair of eyeglasses and that a frame of the sunglasses includes the lens frame portion 12 and two temple portions 14. The two temple portions 14 are pivotally mounted on the lens frame portion 12.

As further shown in FIG. 1, a hang tag 16 is connected to the sunglasses 10 by a string, cable, cord or other filamentary structure 18. A clip 20 extends about the string 18 and is normally cinched close to the intersection of the lens frame portion and the temple portion. This secures the hang tag 16 to the sunglasses and prevents removal of the hang tag prior to purchase of the sunglasses. The string 18 is normally tied to itself to form a continuous loop.

Figure 5:
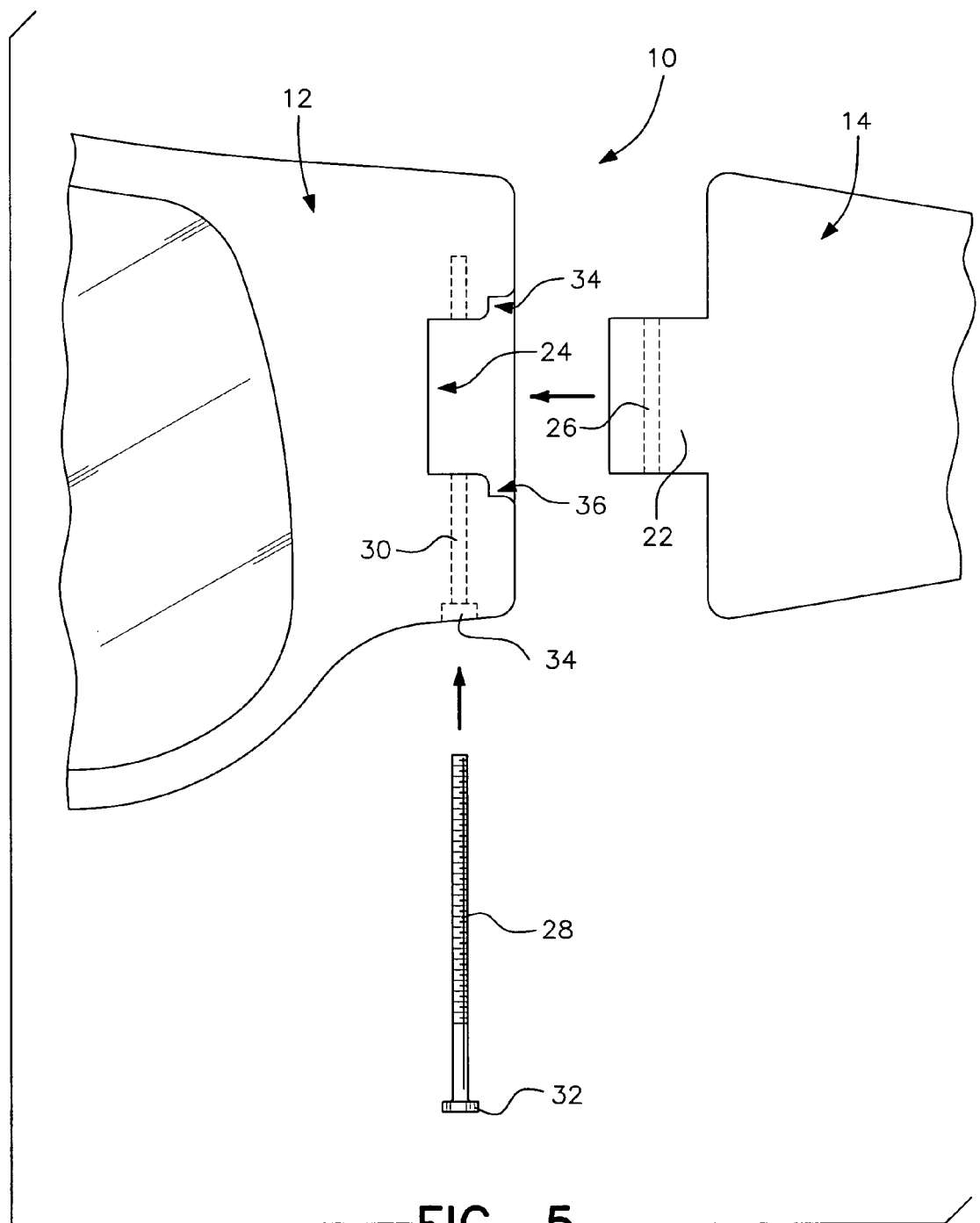
FIG. 5 is an exploded view of the temple portion and lens frame portion and their interconnecting screw.

With reference to FIG. 5, the sunglasses 10 are formed by positioning a temple extension portion 22 of the temple portion 14 within a recess 24 of the lens frame portion 12. A through bore 26 of the temple extension portion 22 is provided for a connecting screw 28 which extends through a bore 30 of the lens frame portion such that a head 32 of the screw is seated in a complementary shaped recess 34 of the lens frame portion.

Figure 6:
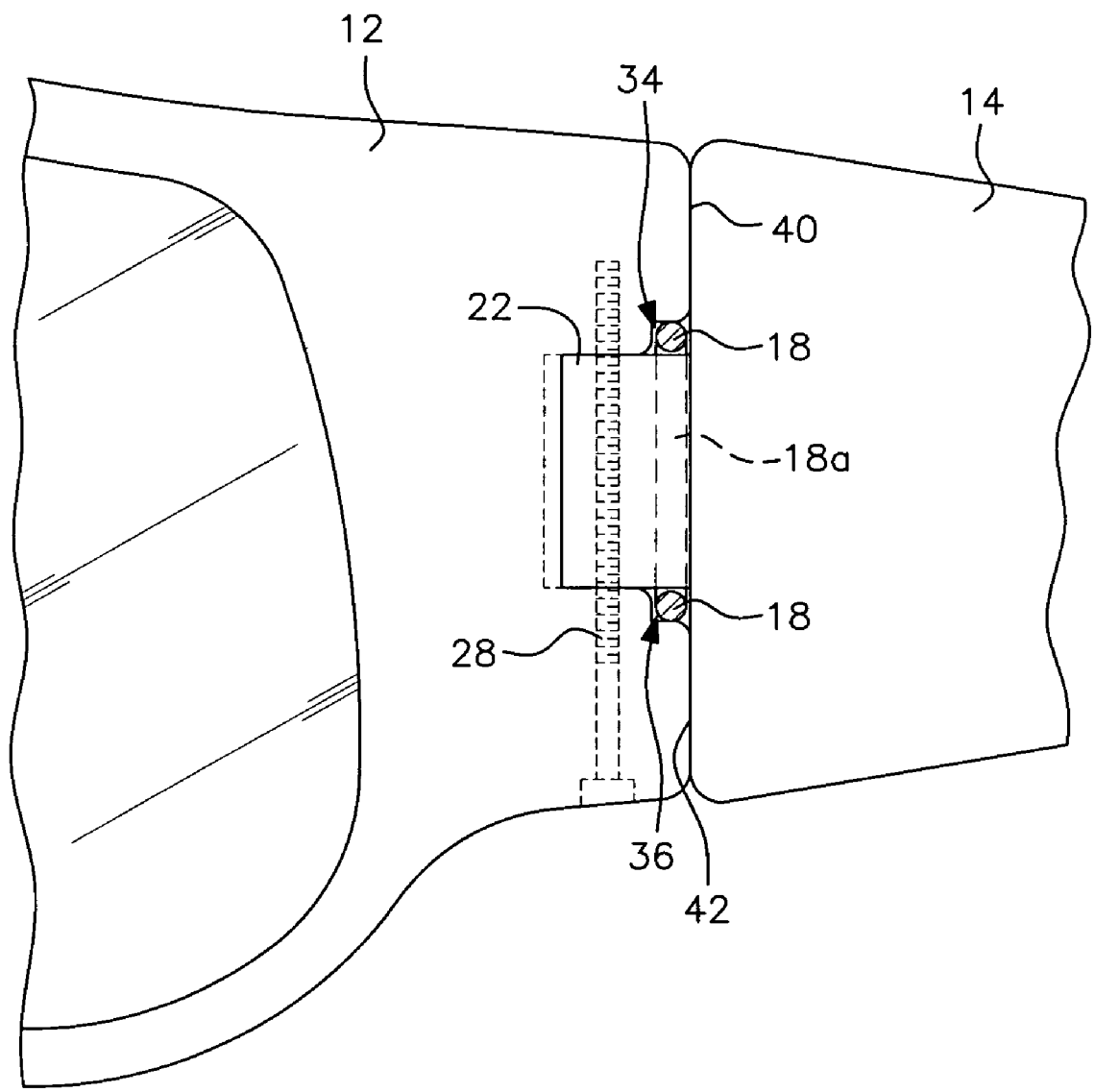
FIG. 6 is an assembled view of the portions shown in FIG. 5 with a string of a hang tag shown slidably mounted in a groove or recess of the lens frame portion.

As will be seen with reference to the other drawings, when the temple extension portion 22 is fitted in the recess 24, two gaps 34, 36 are formed above and below, respectively, the temple extension portion 24. This is best shown in FIG. 6. Slidably mounted within the gaps or recesses 34, 36 is string 18 connecting the hang tag 16 to the sunglasses. Also, as shown in dotted lines in FIG. 6, string 18 fits in a portion of a recess behind the temple extension portion 22, spaced from a wall of the lens frame portion 12.

Figure 2:
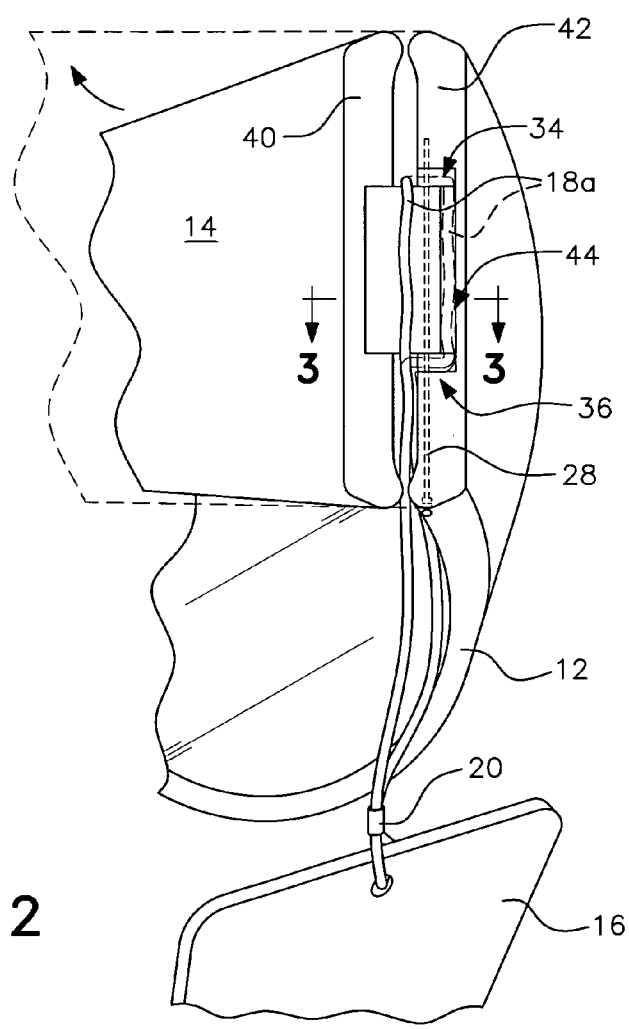
FIG. 2 illustrates the pivotal positioning of the temple portion with respect to the lens frame portion and, in dotted lines, showing a complete extension of the temple portion with respect to the lens frame portion and the positioning of the string of the hang tag in a groove or recess defined, in this example, as part of the recess of the lens frame portion within which an extension of the temple portion is pivotally mounted.

This is also shown in FIG. 2 where string portion 18a is moved from the position in solid lines when the temple portion 14 is bent inwardly as compared to the position shown in dotted lines where the string portion 18a is slidably mounted between the temple extension portion and the lens frame portion 12. When string portion 18a is shown in dotted lines, the sunglasses are wearable without interference from string 18.

As shown in FIGS. 2 and 6, an edge 40 of the temple portion 14 is able to fully engage with an edge portion 42 of the lens frame portion 12 for complete opening of the sunglass frame. The string 18 is slidably mounted in the gaps or grooves 34, 36 in the lens frame portion, above and below the temple portion 14 and behind the temple extension portion 22 in a portion of the gap or recess 44 as shown in FIG. 2.

Figure 3:
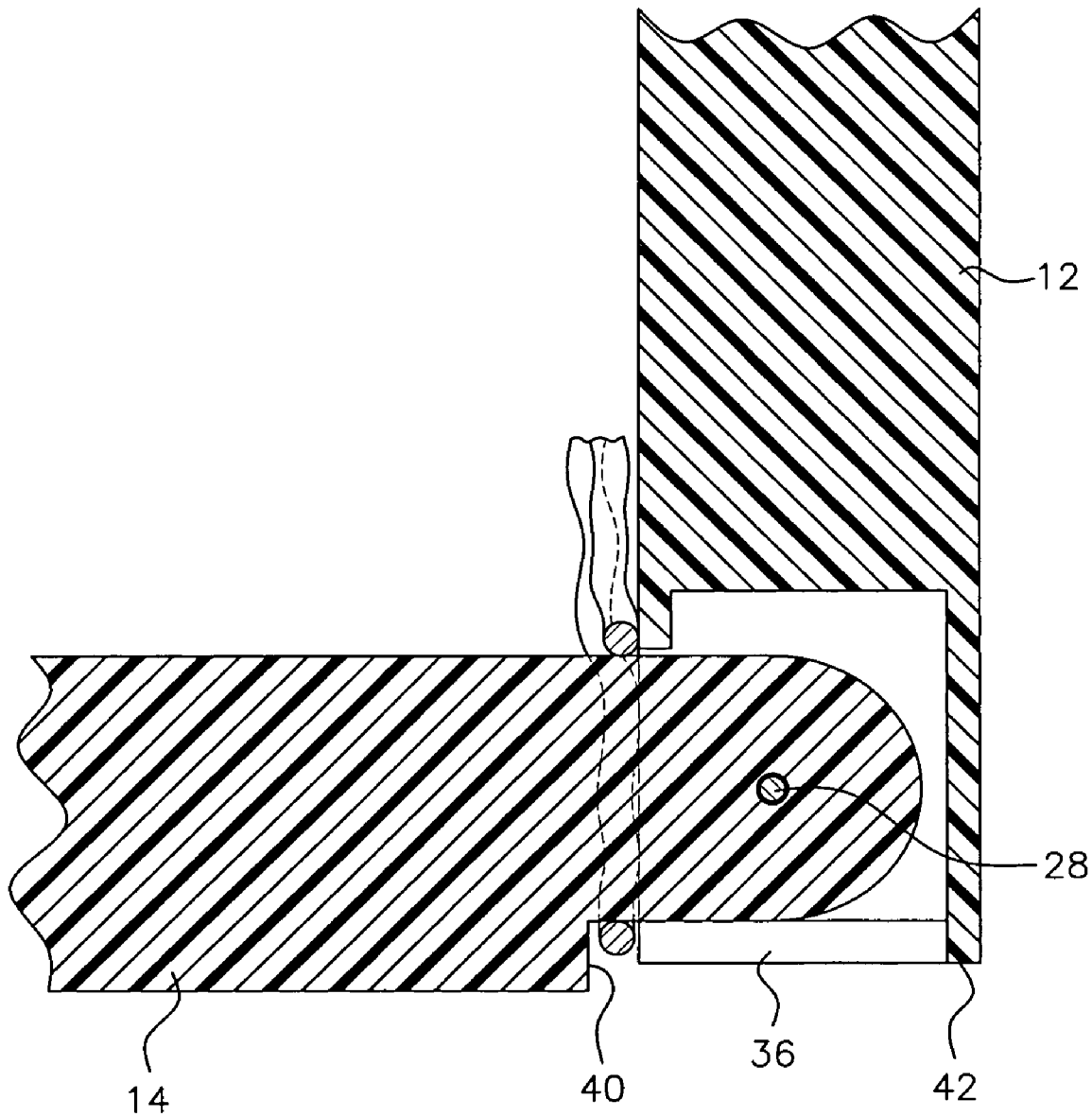
FIG. 3 is a sectional view taken along line 3-3 of FIG. 2.
Figure 4:
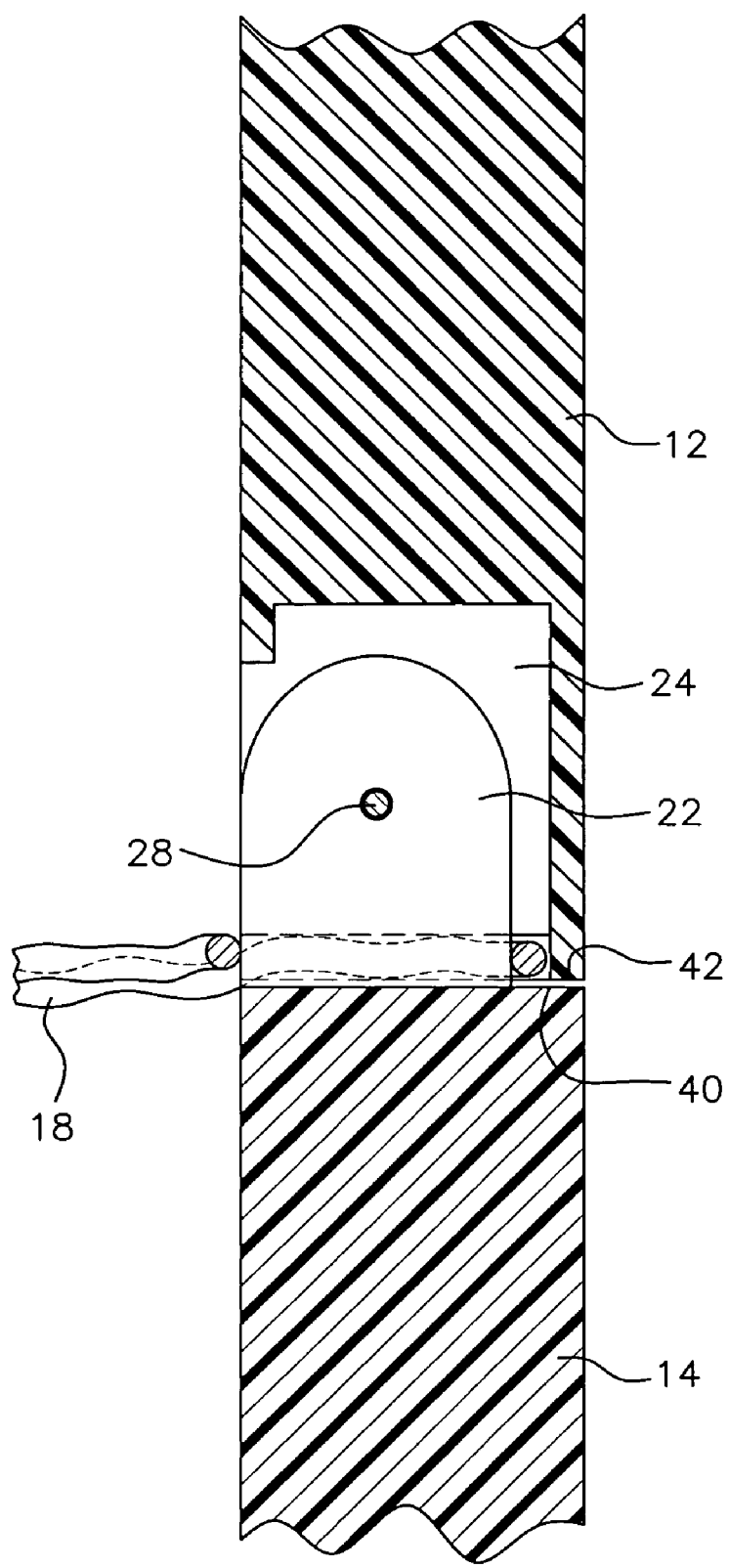
FIG. 4 is a sectional view taken along line 4-4 of FIG. 1.

Thereby, by the pivoting of the temple portion 14 with respect to the lens frame portion 12 as shown in FIGS. 3 and 4, the string 18 is accommodated in recesses or grooves defined between the temple extension portion 22 and the recess 24 of the main frame portion. The temple portion is thereby able to be fully extended so that mating surfaces of the temple portion and main frame portion 12 can fully engage for a true and accurate fitting of the sunglasses on a potential consumer. A more accurate assessment of the in use appearance of the sunglasses of the present invention is thereby achieved.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A pair of eyeglasses comprising
a frame including a lens frame portion and two temple portions,
each temple portion having a temple extension portion, said temple extension portion being pivotably mounted in a recess of said lens frame portion, and
a passageway defined between said lens frame portion and said temple portion, said passageway terminating in two gaps spaced vertically above and below the recess, the temple portion in a fully extended position, having the lens frame part and said temple portion, above and below the temple extension portion, contacting each other for wearing of the eyeglasses, said passageway being adapted for slidably receiving a string with the string exiting through the two gaps of the passageway.

2. The eyeglasses according to claim 1, further comprising a tag connected by a string to said temple portion.

3. The eyeglasses according to claim 1, wherein said passageway is rectangular in shape.

4. The eyeglasses according to claim 1, wherein a pathway for the string includes said passageway above and below the temple extension portion and a part of the recess of said lens frame portion.

5. A pair of eyeglasses comprising
a frame including a lens frame portion and two temple portions,
said two temple portions being pivotably mounted on said lens frame portion,
a recess in said lens frame portion accommodating one of the two temple portions, and
a string secured to said one temple portion and allowing a complete extension of said one temple portion and contact of an end edge of said one temple portion and an end edge of said lens frame portion with capture of a portion of said string between said lens frame portion and said one temple portion in a passageway with the passageway terminating in two spaced gaps above and below the recess for threading of the string in the passageway and exiting of the string through the two spaced gaps.

* * * * *